(12) United States Patent
Maas

(10) Patent No.: US 6,473,978 B1
(45) Date of Patent: Nov. 5, 2002

(54) WHEEL ALIGNMENT ASSEMBLY AND METHOD

(75) Inventor: Charles A. Maas, Troy, MI (US)

(73) Assignee: Schenck Pegasus Corporation, Troy, MI (US)

(*) Notice: Subject to any disclaimer, the term of this patent is extended or adjusted under 35 U.S.C. 154(b) by 0 days.

(21) Appl. No.: 09/098,261

(22) Filed: Jun. 16, 1998

(51) Int. Cl.[7] .................. G01B 5/255; G01B 11/275
(52) U.S. Cl. .......................... 33/203.13; 33/203.14
(58) Field of Search ................ 33/203.12, 203.13, 33/203.14, 203.21; 702/105

(56) References Cited

U.S. PATENT DOCUMENTS

| | | | |
|---|---|---|---|
| 2,016,943 A | * 10/1935 | LeFlar | 73/123 |
| 3,411,346 A | * 11/1968 | Gagliardi | 73/117 |
| 3,643,337 A | * 2/1972 | Dick | 33/203.13 |
| 3,762,239 A | * 10/1973 | Rouis | 74/494 |
| 4,424,700 A | 1/1984 | Erickson et al. | |
| 4,547,945 A | 10/1985 | Lawson | |
| 4,563,975 A | 1/1986 | Kozlowski et al. | |
| 4,596,506 A | * 6/1986 | Burgardt et al. | 414/426 |
| 4,622,024 A | 11/1986 | Lawson | |
| 4,635,339 A | 1/1987 | Kozlowski et al. | |
| 4,804,068 A | 2/1989 | Carter | |
| 4,854,702 A | 8/1989 | Stieff | |
| 4,856,199 A | 8/1989 | Merrill et al. | |
| 4,879,670 A | 11/1989 | Colarelli, III | |
| 4,886,101 A | 12/1989 | Kinnick et al. | |
| 4,893,413 A | 1/1990 | Merrill et al. | |
| 4,897,926 A | 2/1990 | Altnether et al. | |
| 4,899,218 A | 2/1990 | Waldecker et al. | |
| 4,901,560 A | 2/1990 | Hirano et al. | |
| 4,962,664 A | 10/1990 | Hirano et al. | |
| 4,977,524 A | 12/1990 | Strege et al. | |
| 5,000,038 A | * 3/1991 | Katt | 73/117 |
| 5,029,395 A | 7/1991 | Brauer et al. | |
| 5,035,274 A | 7/1991 | Kinnick et al. | |
| 5,067,348 A | * 11/1991 | Himmier et al. | 73/460 |
| 5,129,149 A | 7/1992 | Colarelli, III et al. | |
| 5,156,049 A | 10/1992 | Douglas | |
| 5,207,001 A | * 5/1993 | Rossato | 33/203.12 |
| 5,297,344 A | 3/1994 | Fukuda et al. | |
| 5,355,586 A | 10/1994 | Fukuda et al. | |
| 5,375,335 A | 12/1994 | Friton et al. | |
| 5,388,057 A | 2/1995 | January | |
| 5,442,549 A | 8/1995 | Larson | |
| 5,452,606 A | 9/1995 | Castelnuovo | |
| 5,488,471 A | 1/1996 | McClenahan et al. | |
| 5,488,472 A | 1/1996 | January | |
| 5,489,983 A | 2/1996 | McClenahan et al. | |
| 5,513,438 A | * 5/1996 | Emmons | 33/203.12 |
| 5,513,439 A | 5/1996 | Brauer et al. | |
| 5,519,489 A | 5/1996 | McClenahan et al. | |
| 5,528,496 A | 6/1996 | Brauer et al. | |
| 5,528,836 A | 6/1996 | Stieff | |
| 5,531,030 A | 7/1996 | Dale, Jr. | |
| 5,532,816 A | 7/1996 | Spann et al. | |

(List continued on next page.)

FOREIGN PATENT DOCUMENTS

SU    586354    * 12/1977    .............. 33/203.13

Primary Examiner—Diego Gutierrez
Assistant Examiner—R. Alexander Smith
(74) Attorney, Agent, or Firm—Bliss McGlynn, P.C.

(57) ABSTRACT

A vehicle wheel support device for use in a wheel alignment assembly including a floating plate assembly movably supported relative to the base upon which a vehicle is positioned. The floating plate assembly includes a pair of rollers disposed in a fixed non-parallel orientation with respect to each other. The floating plate assembly is movably positioned such that a vehicle wheel may be located between the pair of rollers to isolate the vehicle wheel from the base so as to stabilize all forces acting thereon and wherein the rollers rotate the wheel so that various wheel alignment parameters may be measured.

31 Claims, 8 Drawing Sheets

U.S. PATENT DOCUMENTS

| | | |
|---|---|---|
| 5,535,522 A | 7/1996 | Jackson |
| 5,553,389 A | 9/1996 | Winslow et al. |
| 5,557,525 A | 9/1996 | Miichi et al. |
| 5,569,836 A * | 10/1996 | Hill .......................... 73/11.07 |
| 5,586,062 A | 12/1996 | Colarelli, III |
| 5,598,357 A | 1/1997 | Colarelli, III et al. |
| 5,598,358 A | 1/1997 | Gender et al. |
| 5,600,435 A | 2/1997 | Bartko et al. |
| 5,600,893 A | 2/1997 | Phillips |
| 5,619,800 A | 4/1997 | Unruh |
| 5,675,515 A | 10/1997 | January |

* cited by examiner

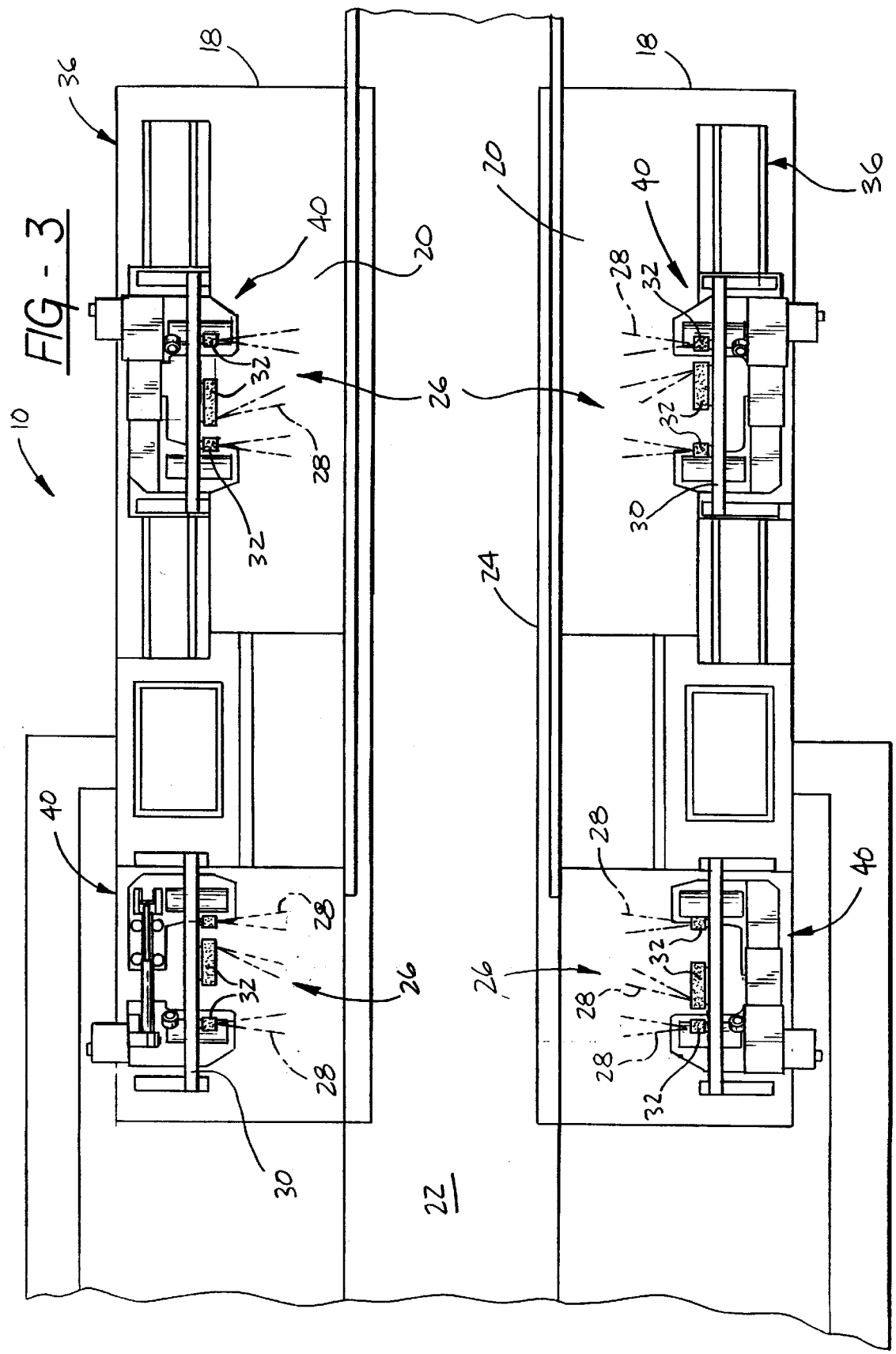

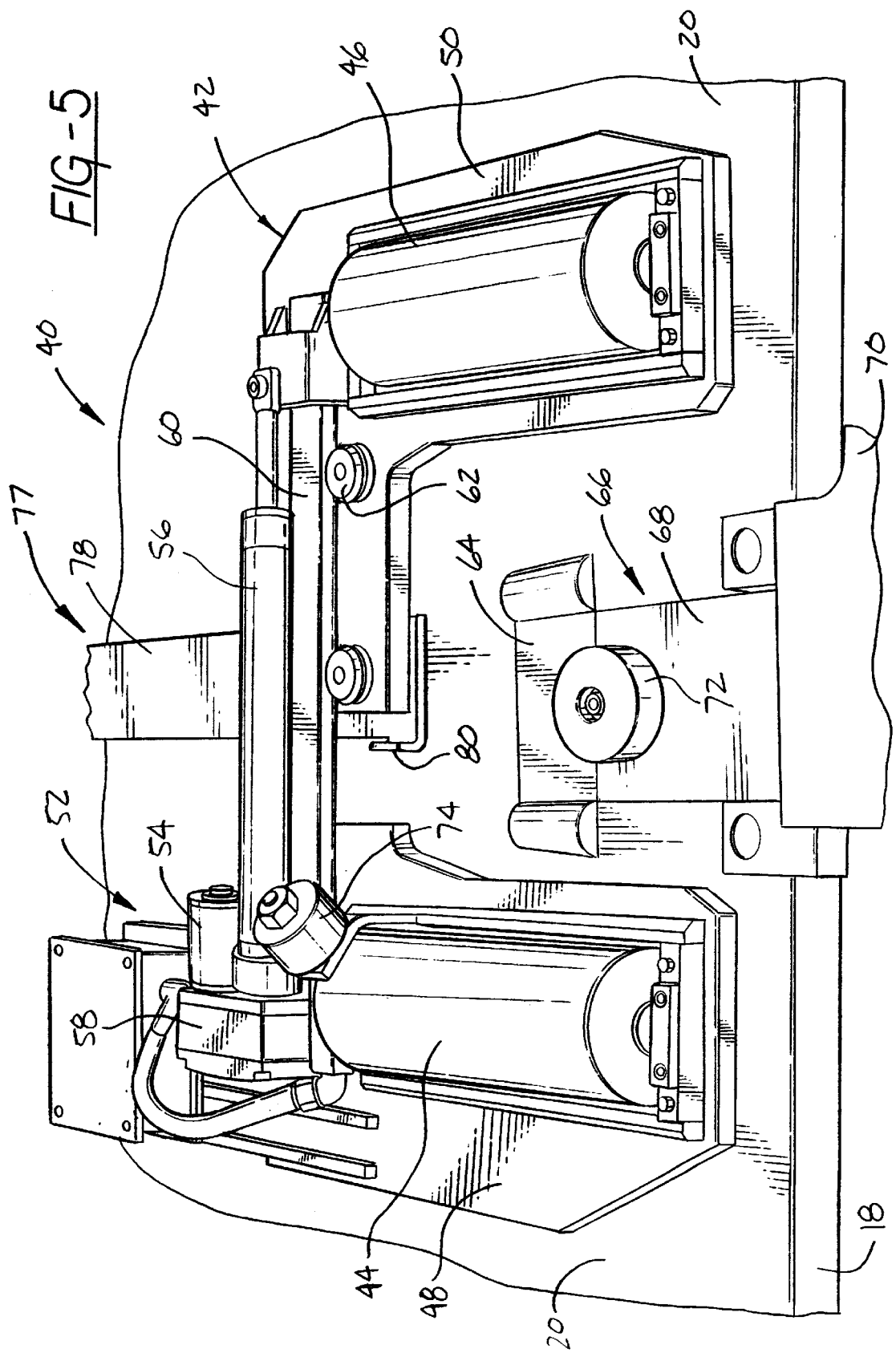

WHEEL ALIGNMENT ASSEMBLY AND METHOD

BACKGROUND OF THE INVENTION

1. Field of the Invention

The present invention relates, generally, to a wheel alignment assembly and method for determining the proper alignment of a vehicle wheel using this assembly. More specifically, the present invention relates to a vehicle wheel support device for use in a wheel alignment assembly.

2. Description of the Related Art

Proper vehicle wheel alignment is an important parameter which is closely monitored during vehicle production in order to provide a smooth, safe ride and to minimize tire wear. Thereafter, vehicle wheel alignment may be periodically checked and adjusted to maintain optimal vehicle operations in the field. Wheel alignment machines are used both during vehicle production and in the field to measure and adjust the toe angle, camber angle, caster angle and ride height of the vehicles. Depending on the sophistication of the machine, other vehicle parameters may be measured and tracked. Historical data and statistical analysis may be recorded and calculated as well.

During vehicle production, the wheels are typically aligned using production alignment machines which are characterized by high vehicle throughput. Any given production facility may employ three or more of these machines. The fully assembled vehicle is driven onto the base of the machine and each tire positioned between a pair of small, parallel rollers by rolling over same. One of the rollers is powered to rotate the wheel during alignment. Conversely, the vehicle tires may contact a large drive roller located between the small parallel rollers which rotates the wheel during the alignment process. The rollers are typically supported on an assembly which is movable to accommodate variances between different vehicles. The roller assembly is also typically movable to compensate for and equalize forces acting on the vehicle wheel which may cause inaccurate alignment readings.

While the roller assembly per se may be movable, the rollers themselves are typically fixed and do not move relative to each other. They also typically remain at all times parallel to each other. However, U.S. Pat. No. 5,513,438 issued to Emmons on May 7, 1996 discloses a wheel support system used in a wheel alignment machine including a pair of rollers which may independently pivot about a pair of axes relative to each other and the base into a non-parallel orientation. The pivotal rollers are fixed against lateral movement relative to each other and otherwise operate in a conventional manner.

Production vehicle wheel alignment machines are also typically characterized in that they require no tooling or fixtures mounted to the tire. They commonly employ electronic measuring devices which measure wheel alignment parameters without physically contacting the vehicle wheel. However, production wheel alignment machines also suffer from the disadvantages that they are complex, structurally intricate and relatively expensive to manufacture and maintain.

In addition to production wheel alignment machines, wheel alignment auditing machines are employed during vehicle production to check the accuracy of the production machines by verifying the alignment of sample vehicles on a statistical basis. In contrast to their production counterparts, wheel alignment auditing machines of the related art are generally characterized by employing tooling or some fixture which is mounted to the vehicle wheel for verifying wheel alignment. While wheel alignment auditing machines are generally less expensive than production machines, they suffer from the disadvantage of being more labor intensive and providing a much lower vehicle throughput than production machines. Wheel alignment devices employed in the field to service vehicles on the road are generally even less expensive but much more labor intensive and slower to operate.

All of the wheel alignment devices employed in the related art have in common the goal of isolating the vehicle wheel from external forces during the alignment process. However, most suffer from an inability to completely equalize all such forces or only achieve this result by employing very expensive mechanisms or slow, labor intensive apparatuses. Thus, there is a need in the art for a wheel alignment assembly which is not overly complex, relatively cost effective, easy to use and efficient and which provides respectable processing times while isolating all forces acting on the vehicle wheel for accurate wheel alignment readings.

SUMMARY OF THE INVENTION

The present invention overcomes the disadvantages in the related art in a vehicle wheel support device for use in a wheel alignment assembly. The wheel alignment assembly may include a base on which a vehicle is supported during the measuring operations and a source of structured light for projecting a structured light pattern onto the tire of the vehicle. The assembly also includes a vehicle wheel support device having a floating plate assembly which is movably supported relative to the base upon which the vehicle is positioned. The floating plate assembly includes a pair of rollers disposed in a fixed, non-parallel orientation with respect to each other. The floating plate assembly is movably positionable such that the vehicle wheel may be located between the pair of rollers to isolate the vehicle wheel from the base so as to stabilize all forces acting thereon. Rotational movement is then imparted to the wheel via the rollers so that various wheel alignment parameters may be measured. A method of measuring predetermined alignment characteristics of a vehicle wheel employing the wheel alignment assembly of the present invention is also disclosed.

The fixed, non-parallel orientation of the rollers with respect to each other as well as the non-parallel position of at least one of the rollers relative to the base serves to provide a stabilizing effect on the vehicle wheels after having been lifted from the base and results in an equalization of all forces acting on the vehicle wheel without using fixtures or any other vehicle contacting mechanism. This result is achieved in a vehicle wheel support device which avoids the relative complexity of similar devices employed in the related art. As such, the vehicle wheel support device employed in the wheel alignment assembly of the present invention is also cost effective and easy to use and enjoys respectable vehicle throughput processing times.

One advantage of the wheel alignment assembly of the present invention is that it optimizes wheel alignment audit procedures while eliminating contact with the vehicle body and chassis, shortens cycle time and ensures the accuracy and repeatability of wheel alignment.

Another advantage of the present invention is that it allows for reduced operator influence on measurements, facilitates low maintenance costs and reduced downtime.

Still another advantage of the present invention is that it allows for simple set up and calibration, fast data acquisition and processing.

And still another advantage of the present invention is that it provides for simplified operation, ease of service and provides for on-line troubleshooting.

BRIEF DESCRIPTION OF THE DRAWINGS

Other advantages of the invention will be readily appreciated as the same becomes better understood by reference to the following detailed description when considered in connection with the accompanying drawings, wherein:

FIG. 3 is a top plan view of the wheel alignment assembly of the present invention;

FIG. 5 is a perspective view of a vehicle wheel support device of the present invention;

DETAILED DESCRIPTION OF THE PREFERRED EMBODIMENT(S)

Figure 1:
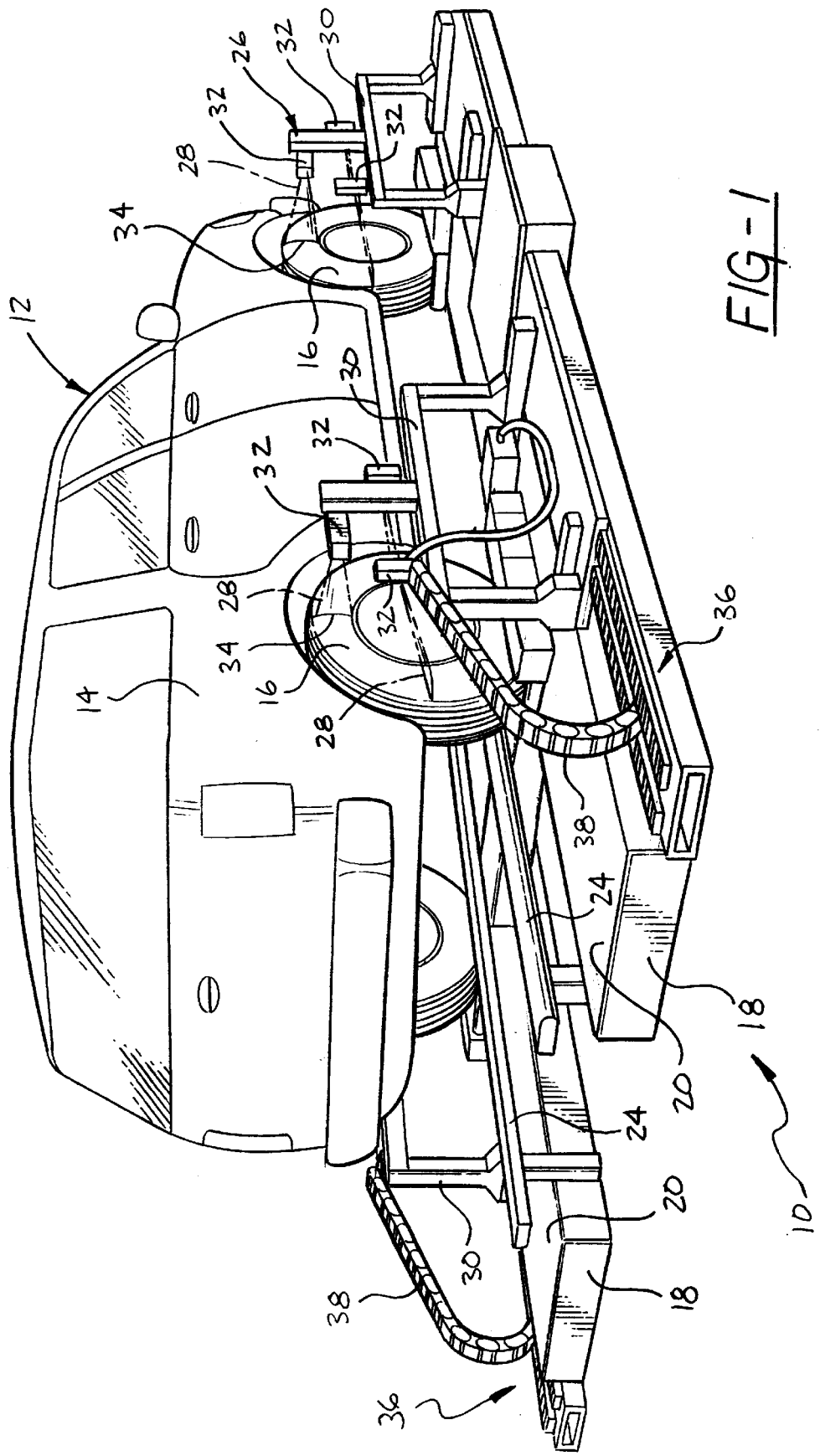
FIG. 1 is a perspective view of the wheel alignment assembly of the present invention for measuring predetermined alignment characteristics of a vehicle wheel showing a vehicle mounted thereon.

A vehicle wheel alignment assembly for measuring predetermined alignment characteristics of a vehicle wheel having a tire mounted thereon is generally indicated at 10 in FIG. 1 where like numerals are used to designate like structure throughout the drawings. A vehicle 12 is shown located on the assembly 10 while the rotational position of the wheels are being sensed. The vehicle 12 shown in FIG. 1 is meant to be a generic representation of all types of vehicles and, as such, includes a vehicle body 14 carried on a chassis (not shown). The vehicle 12 has four wheels 16 rotatably supported on the chassis via front and rear axles (also not shown). Each wheel 16 has a tire mounted thereon. Unless otherwise specified, as used generically herein, the term "wheel" will refer to the unsprung, rotating mass of the vehicle wheel including, but not limited to, the metal wheel, brake rotor, tire, wheel cover, hub cap and the like. The wheel alignment assembly 10 of the present invention may be employed for determining the proper alignment of the vehicle wheel 16 and, in particular, for auditing the alignment of the wheels 16 in a vehicle production environment. In such an environment, selected vehicles may be audited after having first been aligned using a production vehicle wheel alignment machine. In this way, the accuracy of the measurements made with the production device may be monitored and steps taken to recalibrate the production alignment machine where deviations from standard specifications for alignment characteristics are noted using the wheel alignment assembly 10 of the present invention.

Figure 2A:
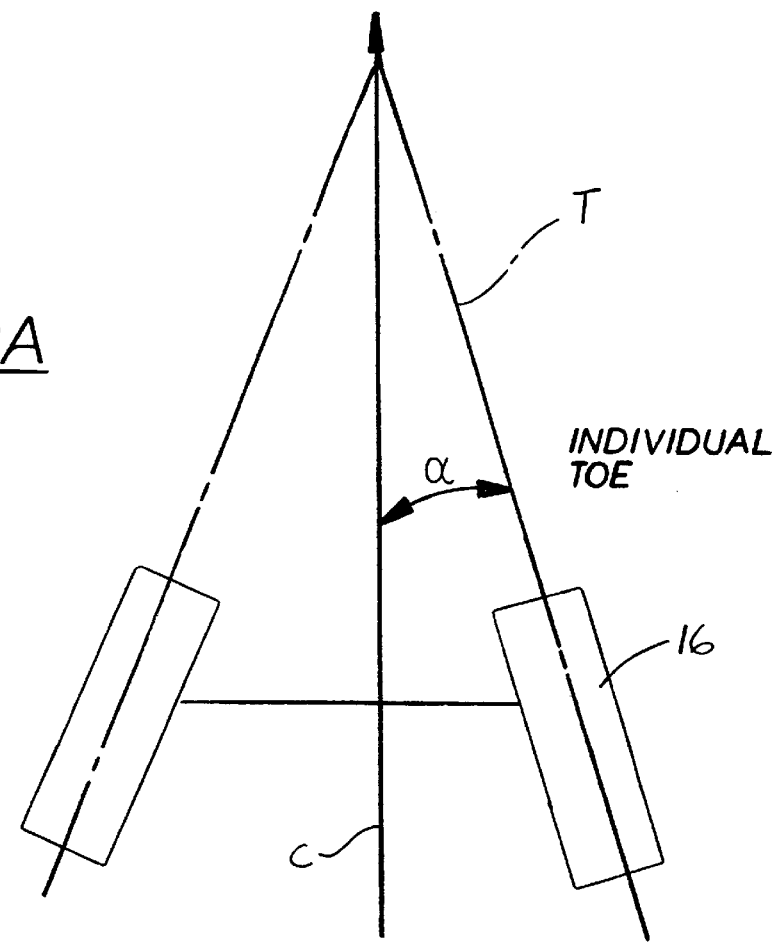
FIG. 2A is a schematic drawing illustrating toe angle for a vehicle wheel.
Figure 2B:
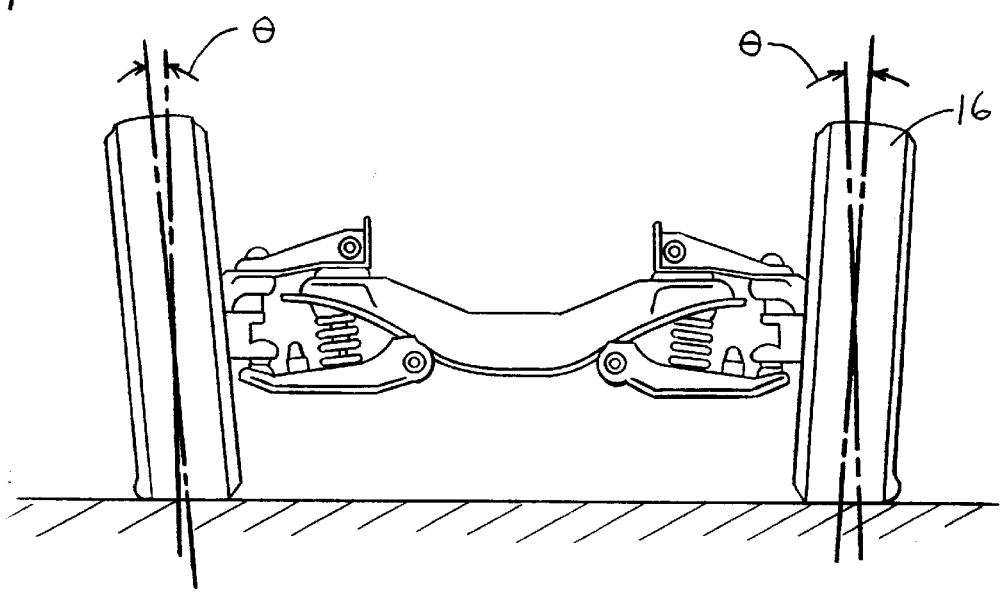
FIG. 2B is a schematic diagram illustrating the camber angle for a vehicle wheel.
Figure 2C:
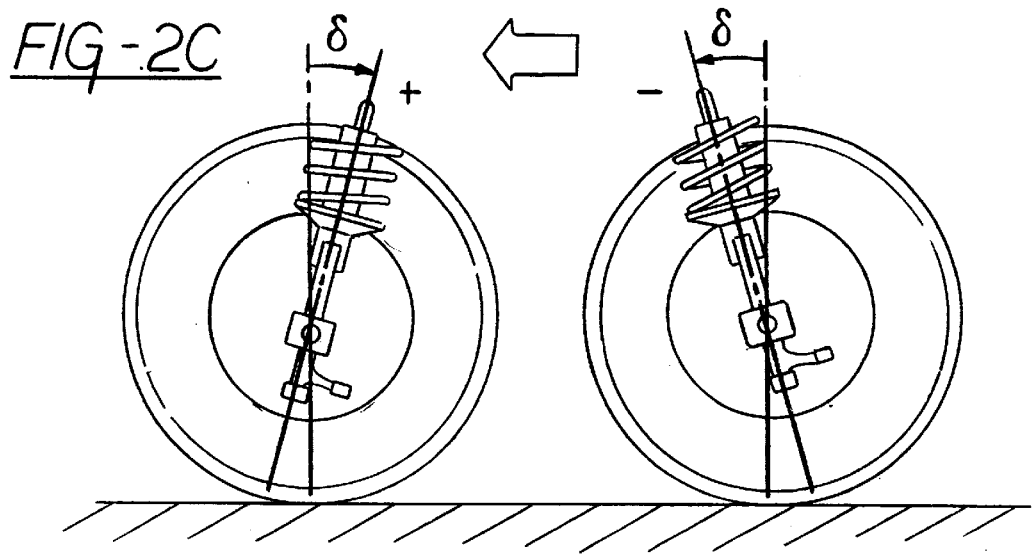
FIG. 2C is a schematic diagram illustrating the caster angle for a vehicle wheel.
Figure 2D:
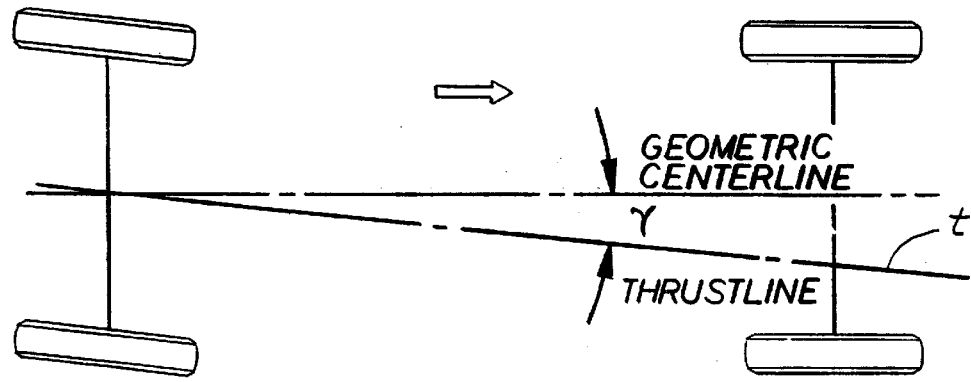
FIG. 2D is a schematic diagram illustrating the thrust angle for a vehicle wheel.

The wheel alignment assembly 10 of the present invention may be employed in this way to audit the toe angle, camber angle, castor angle, and thrust angle of the vehicle 12. Referring now to FIGS. 2A through 2D, as used herein, the toe angle ($\alpha$) is the angle formed by a horizontal line (T) drawn through the plane of one wheel versus a centerline (c) (FIG. 2A). The camber angle ($\theta$) is the inward or outward tilt of the wheel as viewed from the front of the vehicle as shown in FIG. 2B. The Caster angle ($\delta$) is the forward or rearward tilt of the steering axis as viewed from the side of the vehicle as shown in FIG. 2C. A positive caster angle results in a tilt of the steering axis clockwise relative to a vertical line passing through the center of the wheel as viewed in FIG. 2C. A negative caster angle results from a tilt in the counterclockwise direction relative to the same vertical line. The Thrust angle ($\gamma$) is the angle formed between the thrust line (t) and the geometric centerline of the vehicle as shown in FIG. 2D. Each vehicle manufacturer develops specifications for the desired toe angle, camber angle, castor angle and thrust angle for each of its vehicles. Each of these parameters, among others, may be monitored using the wheel alignment assembly 10 of the present invention as described in greater detail below.

The assembly 10 includes a granite base, generally indicated at 18, on which a vehicle 12 is supported during wheel alignment measuring operations. While granite is the material of choice for the base 18 in the preferred embodiment of the present invention, any other material which provides stability may be employed. Portions of the granite base 18 may also have stainless steel plating 20 for a purpose to be described in greater detail below. The base 18 is formed by two rectangular slabs of granite disposed on either side of a pit 22. The base 18 is preferably mounted flush with the floor of the plant and the vehicle 12 is driven onto the base 18 so that it spans the pit 22. The pit 22 provides access to the underside of the vehicle 12 by personnel for purposes of maintenance, manufacturing, or performing testing procedures on the vehicle 12. In addition, other mechanisms such as robots may also be positioned within the pit 22. A guard rail 24 extends longitudinally along each slab of the granite base 18 next to the pit 22 to ensure that the wheels 16 of the vehicle 12 do not fall therein.

The assembly 10 also includes a source of structured light, generally indicated at 26 which projects structured light 28 onto the wheel 16 of the vehicle 12. The term "structured light" means light which is projected in a predetermined geometric pattern and which may include both coherent (laser) and non-coherent light. In the preferred embodiment, the structured light includes a flat plane formed by optically fanning a laser beam. Other structured light configurations are also usable. In this case, however, the source of structured light includes a laser assembly 26 associated with each wheel 16 of the vehicle 12. Each laser assembly 26 is movable fore and aft relative to the vehicle 12 for accurately positioning the laser assembly 26 relative to successive vehicles 12 measured on the wheel alignment assembly 10. To this end, each laser assembly 26 includes a support structure 30 on which are mounted two or more (in this case three) lasers 32 which project the structured light 28 so as to define contour lines 34 on the side wall of the wheel 16 of the vehicle 12.

Each of the contour lines 34 are viewed and recorded on an integrated charged coupled device (CCD) video camera for processing and evaluation using the triangulation method disclosed in U.S. Pat. Nos. 4,745,469 and 4,899,218, both assigned to Perceptron, Inc. of Farmington Hills, Mich. and incorporated herein by reference. The lasers 32 employed by the assembly 10 of the present invention may also be purchased from Perceptron, Inc.

The assembly 10 also includes a movable conveyor system, generally indicated at 36, and associated with each laser assembly 26 corresponding to the rear wheels, for moving the laser assembly 26 fore and aft relative to the vehicle 12 and relative to the base 18 to adjust for vehicles having different lengths. The conveyor system 36 may include a wire harness 38 operatively connected to the lasers 32 through the support structure 30 which prevents associated wires from becoming tangled as successive vehicles 12 are processed on the assembly 10.

As best shown in FIGS. 5 through 8, the assembly 10 also includes a vehicle wheel support device, generally indicated at 40, and associated with each wheel 16 of the vehicle 12. The vehicle wheel support device 40 includes a floating plate assembly, generally indicated at 42, which is movably supported relative to the base 18. The floating plate assembly 42 includes a pair of rollers 44, 46 disposed in fixed non-parallel orientation with respect to each other. In addition, at least one 44 of the pair of rollers 44, 46 is disposed in fixed non-parallel orientation with respect to the base 18. The floating plate assembly 42 is movably positionable over the steel plate 20 on the granite base 18 such that a vehicle wheel may be located between the pair of rollers 44,46. The floating plate assembly 42 is typically manually positioned in this manner by a technician. However, those having ordinary skill in the art will appreciate that such positioning of the floating plate assembly could be automated. Furthermore, the rollers 44, 46 may be movable in a direction toward and away from one another between a first position wherein the pair of rollers 44, 46 are disposed in non-contacting relation relative to the wheel and a second position wherein the rollers 44, 46 are positioned sufficiently close to one another to lift the vehicle wheel 16 and isolate it from the base 18. In addition, the floating plate assembly 42 is operable such that the pair of rollers 44, 46 will rotate the wheel so that various alignment parameters may be measured as indicated above.

More specifically, the floating plate assembly 42 defines a generally U-shaped configuration and includes a pair of subplates 48, 50 with the pair of rollers 44, 46 supported on the pair of subplates 48, 50, respectively. An actuator, generally indicated at 52, is operable to move the subplates 48, 50 in a direction toward and away from one another. The actuator 52 may include a drive motor 54 mounted to the subplate 48 and operatively connected to a ball screw 56 through a gear box 58. The ball screw 56 spans the subplates 48, 50. The ball screw 56 extends and contracts to move the subplates 48, 50 toward and away from each other. Limit switches may be employed to control the movement of the ball screw 56 and, in turn, the movement of the subplates 48, 50 toward and away from one another. The floating plate assembly 42 further includes a guide rail 60 spanning the subplates 48, 50 and a set of guide rollers 62 supported on the L-shaped subplate 50. The guide roller 62 serves to operatively engage the guide rail 60 to ensure rectilinear movement between the subplates 48, 50 as they are moved toward and away from one another.

To facilitate the movement of the subplates 48, 50 on the base 18, the subplates 48, 50 include a plurality of ball bearings 76 (FIG. 6 and 7) which are in rolling contact with the steel plate 20 covering the granite base 18. This arrangement facilitates the smooth movement of the subplates 48, 50 relative to the vehicle wheel 16. Alternatively, the subplates 48, 50 may be movably supported on a cushion of air for automatic adjustments relative to the vehicle wheel 16, as will be described in greater detail below. As best shown in FIG. 5, a vehicle wheel locator 64 is positioned on the base 18 to facilitate the proper positioning of the vehicle 12 on the assembly 10. A wheel centering mechanism, generally indicated at 66 is also employed to center the wheels 16 and align them longitudinally relative to the base 18 and the centerline of the vehicle 12 prior to and sometimes during the time that the wheel alignment parameters are being measured. The centering mechanism 66 includes an extendable and retractable arm 68 which is supported on a brace 70 spanning the pit 22. The arm 68 is movable using pneumatics, mechanics, electromechanics or any other suitable mechanism to bring centering roller 72 into engagement with the inner facing side wall of the tire mounted on the wheel 16. Centering mechanism 66 may be employed in connection with both the steerable front tires and non-steerable rear tires of the vehicle 12.

As best shown in FIG. 5 the assembly 10 further includes a fore and aft locating plate, generally indicated at 77, which is mounted to the conveyor system 36 and therefore movable fore and aft relative to the base 18 in any vehicle. The fore and aft locating plate 77 includes a generally flat plate 78 and an upstanding tab 80 disposed at the distal end thereof. The tab 80 is positioned so as to be between the pair of subplates 48, 50 and to serve to locate the subplates 48, 50 when they are moved to their second position and sufficiently close to one another to lift the vehicle. The fore and aft locating plate 77 thus serves to coordinate the position of the lasers 32 supported on the structure 30 with the position of the subplates 48, 50 in the fore and aft direction longitudinally relative to the assembly 10. It should be noted that, while the upstanding tab 80 is disposed between the subplates 48, 50 as illustrated in FIG. 5, tab 80 is not clamped therebetween and the subplates 48, 50 are still free to automatically adjust or otherwise move relative to the wheel 16.

The pair of rollers include a drive roller 44 which is positively rotationally driven with respect to the wheel 16 and an idler roller 46, which is not powered. The floating plate assembly 42 also includes a cam roller 74 which is adapted to engage the outer side wall of the tire opposite the centering mechanism 66 and to equalize forces acting in a transverse direction relative to the wheel 16 during operations thus stabilizing the floating plate assembly 42 relative to the tire.

Figure 9A:
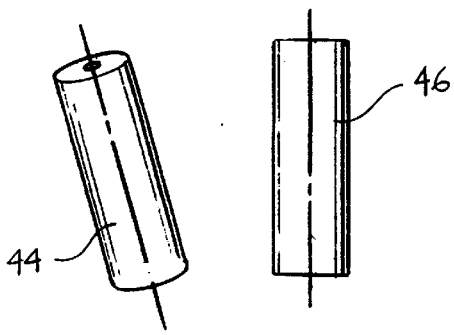
FIG. 9A is a schematic top view of the rollers of the wheel support device of the present invention illustrating the rollers disposed in a non-parallel relationship with respect to each other.
Figure 9B:
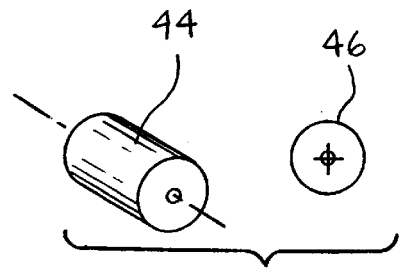
FIG. 9B is a schematic end view of the rollers of the wheel support device of the present invention illustrating the non-parallel relationship of one of the rollers with respect to the base.
Figure 4:
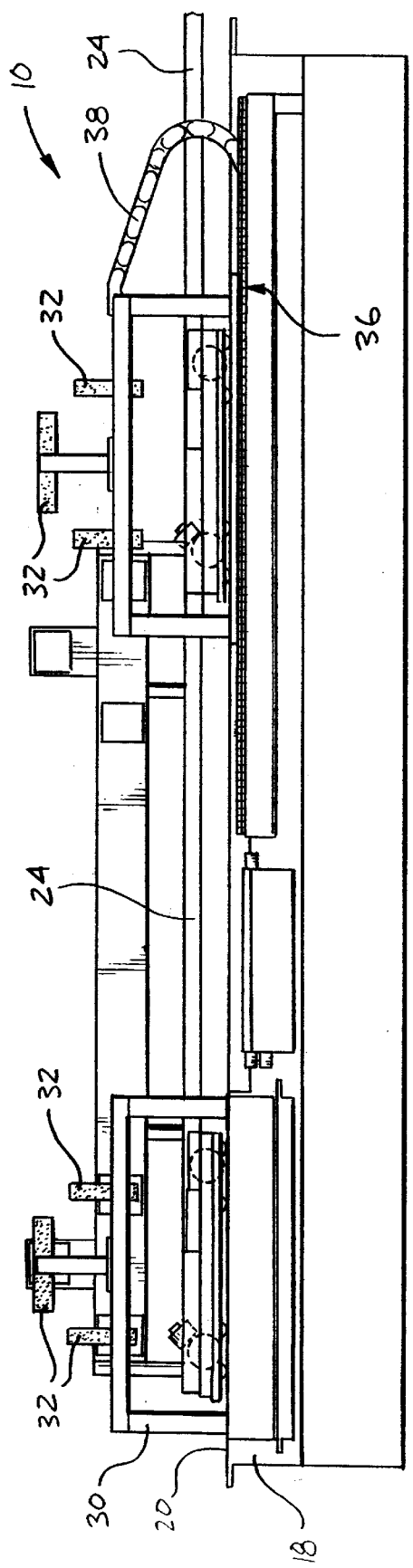
FIG. 4 is a side view of the wheel alignment assembly of the present invention.
Figure 8:
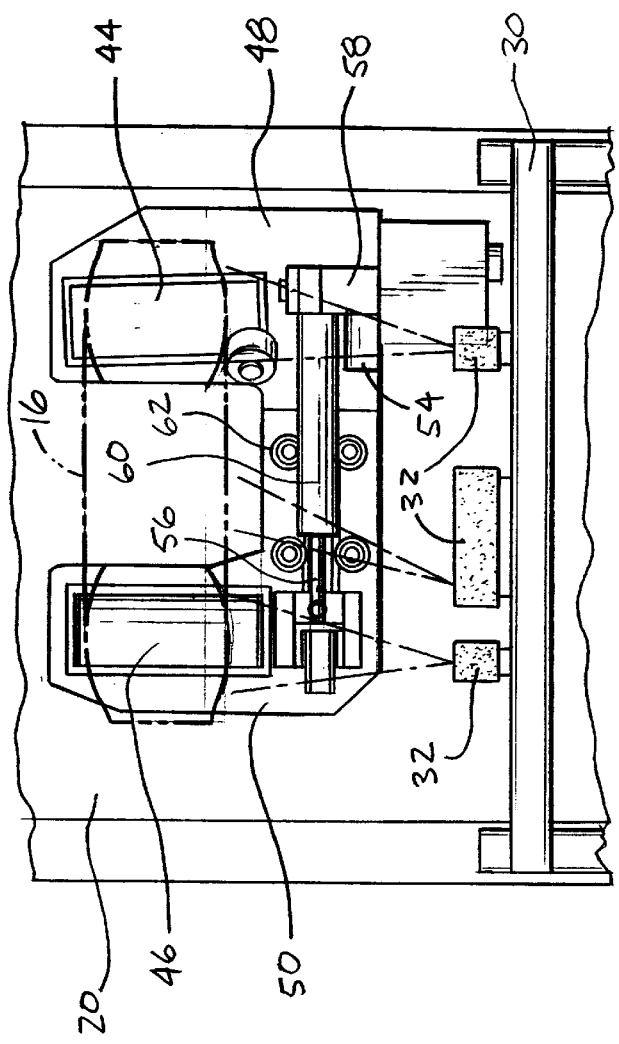
FIG. 8 is a top view of the vehicle wheel support device of the present invention.
Figure 6:
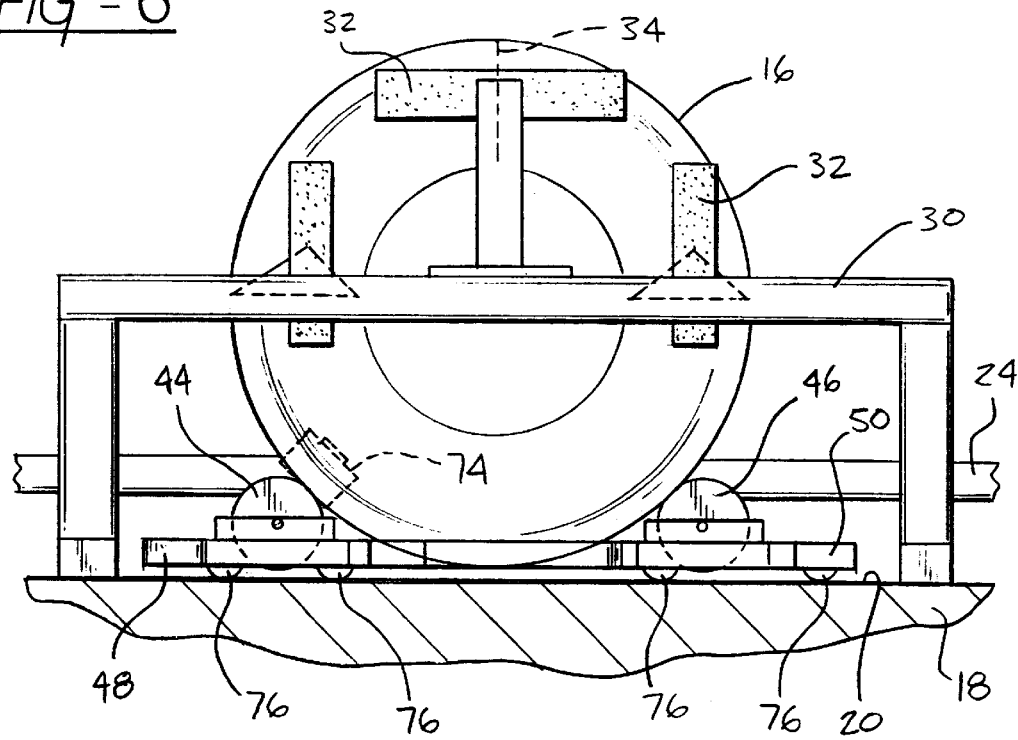
FIG. 6 is a side view illustrating a vehicle wheel supported on a wheel support device of the present invention and positioned next to a source of structured light such as a laser.
Figure 7:
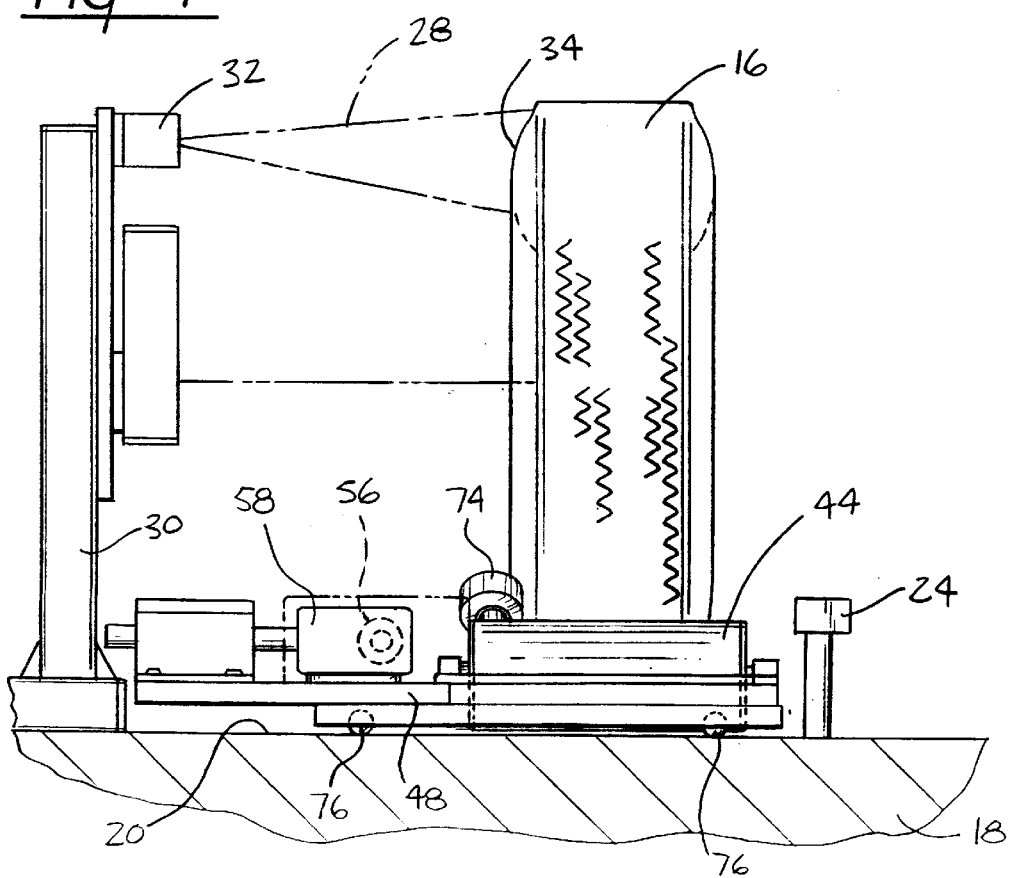
FIG. 7 is an end view of a vehicle wheel supported upon the wheel support device of the present invention and illustrating a source of structured light, such as a laser being impinged upon the vehicle wheel.

As noted above and best shown schematically in FIGS. 9A and 9B, the drive roller 44 is fixed in a non-parallel relationship with respect to the idler roller 46. In essence, the rollers 44, 46 are skewed 2° to 3° relative to each other. This disposition is exaggerated in FIG. 9A for illustrative purposes. In addition, the drive roller 44 is also fixed in a non-parallel orientation relative to the base 18 so as to define an incline of 2° to 3° relative to horizontal. This inclination compensates for reduced contact of the drive roller 44 with the tires due to the skewing relative to the idler roller 46. Thus, sufficient surface contact is maintained at all relevant times between the drive rollers 44 and the tires mounted to the wheels 16 and keeps the tires at a reasonably constant height regardless of position of the rollers.

During alignment measuring operations, the vehicle 12 is driven onto the base 18 and each vehicle wheel 16 is positioned by the vehicle wheel locator 64. The floating plate assembly 42 is then manually positioned by a technician such that the rollers 44, 46 are disposed spaced from one another and on either side of each tire. The rollers 44, 46 are then automatically moved toward one another via the drive motor 54 acting on the ball screw 56 until the tire is pinched and then raised by the rollers 44, 46. Accurate positioning of the floating plate assembly 42 relative to the wheel 16, laser 30 and the beam 18 is assisted by the fore and aft locating plate 77. The centering mechanism 66 may also be employed to ensure that the front and rear tires are properly aligned relative to the longitudinal axis of the wheel alignment assembly 10. The drive roller 44 is then powered thus rotating the tire. The skewed position of the rollers 44, 46 relative to each other and to the base results in the floating plate assembly 42 moving relative to the vehicle tire, automatically adjusting its position until all forces acting on the wheel 16 are stabilized. To this end, the floating plate assembly 42 has a tendency to be drawn in toward the wheels 16 such that the cam roller 74 engages the outer side wall of each tire. This movement of the floating plate assembly 42 will continue until the forces acting in a transverse direction relative to the wheel 16 through the cam roller 74 are equalized. Once the forces are equalized, the floating plate assembly 42 is then stabilized relative to the wheel 16 and all forces which may be acting on the wheel 16 which could cause false readings from the measuring devices are neutralized.

Once the floating plate assembly 42 has been stabilized relative to the wheel 16, the wheel 16 will continue to be rotated under the influence of the drive roller 44. The laser assembly 26 associated with each wheel of the vehicle projects structured light 28 thereon so as to form contour lines 34 on each wheel. Each of contour lines 34 are then viewed and recorded on an integrated charged coupled device (CCD) video camera and the various calculations performed to measure the toe angle, camber angle, caster angle and thrust angle for the particular vehicle. If these readings are within acceptable ranges, the vehicle is then passed through the wheel alignment assembly 10 of the present invention. If, however, the measured parameters do not fall within accepted limits, the vehicle may be flagged for further adjustments and the production wheel alignment machine (if any) which originally was employed to verify and adjust the wheel alignment may be further calibrated. It should be noted that all four floating plate assemblies 42 associated with each wheel 16 on the vehicle work independently of one another and at the same time.

Figure 10:
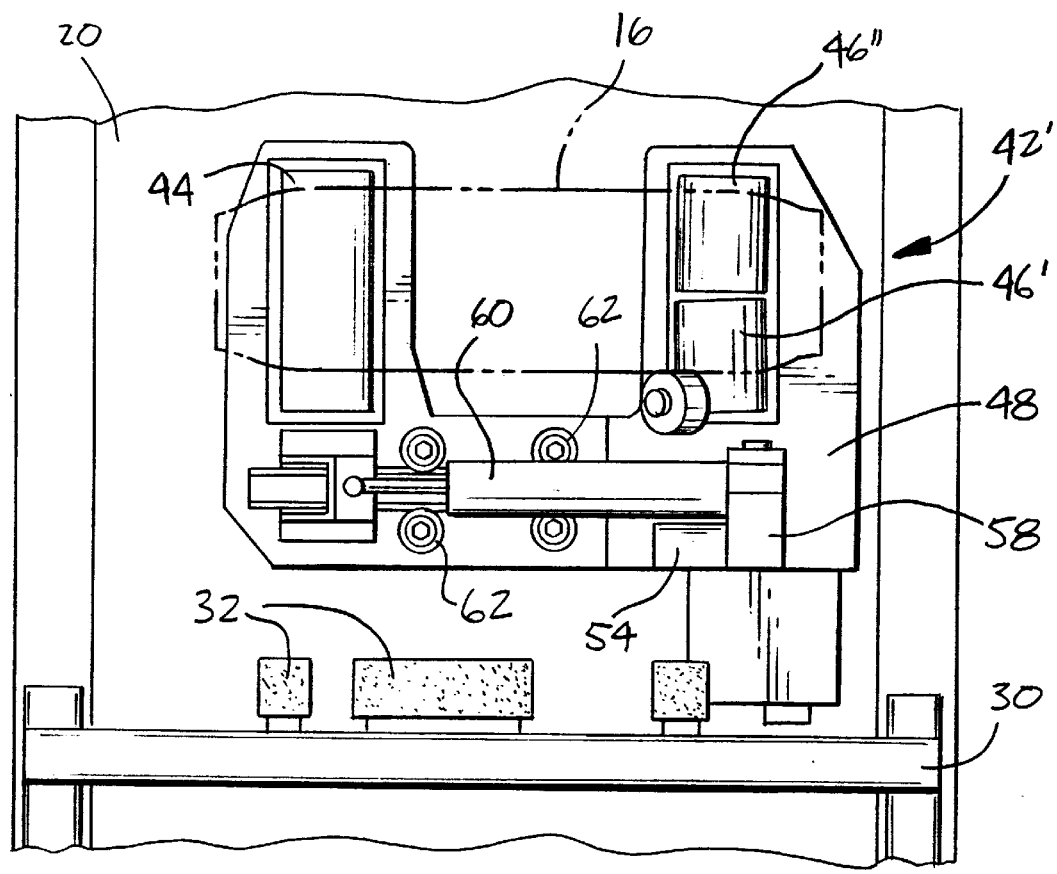
FIG. 10 is a top view of an alternative embodiment of the vehicle wheel support device of the present invention.
Figure 11A:
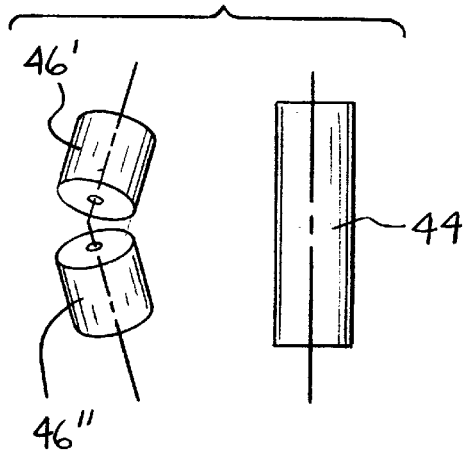
FIG. 11A is a schematic top view of the rollers of the alternate embodiment of the wheel support device of the present invention illustrating the idler rollers disposed in non-parallel relationship with respect to each other as well as with respect to the drive roller.
Figure 11B:
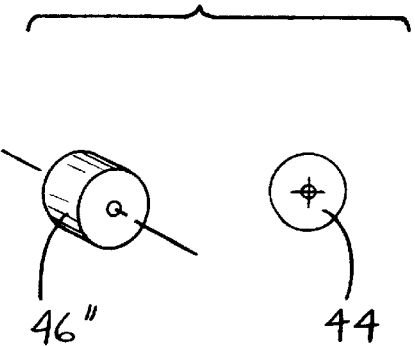
FIG. 11B is a schematic end view of the rollers of the alternate embodiment of the wheel support device of the present invention illustrating the non-parallel relationship of the idler rollers with respect to the base.

An alternate embodiment of the floating plate assembly is generally indicated at 42' in FIGS. 10, 11A and 11B where like numerals are used to designate like structure, some of which have been primed. Here, the cam roller 74 has been eliminated. In addition, the structure of the rollers have been altered to include a drive roller 44 and a pair of idler rollers 46' and 46". The pair of idler rollers 46' and 46" are disposed in fixed, non-parallel orientation with respect to the drive roller 44 and form a slight obtuse angle which faces the drive roller 44. In addition, the idler rollers 46', 46" are each disposed in fixed, non-parallel orientation with respect to one another. Still further, the idler rollers 46', 46" are disposed in a fixed, non-parallel orientation with respect to the base 18 and form a slight obtuse angle which faces the base 18. The drive roller 44 is motorized and the idler rollers 46', 46" are not. The pair of idler rollers 46', 46" effectively eliminate the need for a cam roller 74 but serve, essentially, the same purpose. More specifically, the idler rollers 46', 46" cooperate to equalize forces acting on the wheel 16 during operation thus stabilizing the floating plate assembly 42' relative to the tire. In addition, use of the pair of skewed idler rollers 46', 46" in the way disclosed in the Figures eliminates contact with the side wall of the tire. The floating plate assembly 42' illustrated in this Figure operates in the same manner as the floating plate assembly 42 and alignment operations as described above are thus the same in connection with this embodiment.

The present invention is also directed toward a method of measuring predetermined alignment characteristics of a vehicle wheel 16 having a tire mounted thereon employing the wheel alignment assembly 10 of the present invention. This method includes the steps of positioning the movable floating plate assembly 42 having a pair of rollers 44, 46 such that the wheel is located between the pair of rollers 44, 46. The rollers 44, 46 are then moved in a direction toward one another such that these rollers engage and lift the wheel 16. Rotational movement is then imparted to the vehicle wheel 16. Furthermore, the rotational position of the wheel is sensed, and the alignment characteristics of the wheel 16 is calculated. The alignment characteristics of the wheel 16 so calculated are then compared with predetermined alignment characteristics.

The method of the present invention also includes a step of centering the front and rear wheels prior to sensing the rotational position of the front tires. In addition, the method includes the step of stabilizing the wheels 16 on the rollers 44, 46 prior to sensing the rotational position of the tire. Furthermore, the method also includes the step of centering the wheel 16 after the wheel 16 has been stabilized and before sensing the rotational position of the tire.

The fixed, non-parallel orientation of the rollers 44, 46 with respect to each other as well as the non-parallel position of at least one of the rollers 44 relative to the base 18 serves to provide a stabilizing effect on the vehicle wheels 16 after having been lifted from the base 18 and results in an equalization of all forces acting on the vehicle wheel 16. This result is achieved in a vehicle wheel support device 40 which avoids the relative complexity of similar devices employed in the related art. Thus, the vehicle wheel support device 40 employed in the wheel alignment 10 of the present invention is also cost effective relative to the related art, easy to use and enjoys respectable vehicle throughput processing times. The present invention optimizes wheel alignment auditing procedures, shortens cycle times and ensures the accuracy and repeatability of wheel alignment. In addition, the present invention facilitates reduced operator influence on measurements when compared with wheel alignment machine known in the related art, especially where employed for auditing purposes and facilitates low maintenance costs and reduced down time. Furthermore, the present invention allows for simple set up and calibration, fast data acquisition and processing without contacting the vehicle body or chassis. Finally, the present invention provides for simplified operation through the method of the present invention, ease of service and provides for on-line troubleshooting of the assembly.

The invention has been described in an illustrative manner. It is to be understood that the terminology which has been used is intended to be in the nature of words of description rather than of limitation.

Many modifications and variations of the invention are possible in light of the above teachings. Therefore, within the scope of the appended claims, the invention may be practiced other than as specifically described.

I claim:

1. A vehicle wheel support device for use in a wheel alignment assembly, said device comprising:

a floating plate assembly movably supported relative to a base upon which a vehicle is positioned;

said floating plate assembly including a pair of rollers wherein each of said rollers defines a longitudinal axis disposed in a fixed non-parallel orientation with respect to each other such that each of said longitudinal axes may be contained in any plane such that the plane of one said longitudinal axis is not parallel to the plane of the other said longitudinal axis, said floating plate being movably positionable such that a vehicle wheel may be located between said pair of rollers and to isolate the vehicle wheel from the base so as to stabilize all forces acting thereon and wherein said pair of rollers rotates the wheel so that predetermined wheel alignment parameters maybe measured.

2. A device as set forth in claim 1 wherein said rollers are movable in a direction toward and away from one another between a first position wherein said pair of rollers are spaced relative to one another so as to be disposed in non-contacting relation relative to the wheel and a second position wherein said rollers are positioned sufficiently close to one another to lift the vehicle wheel and isolate it from the base and stabilize all forces acting thereon.

3. A device as set forth in claim 2 wherein said floating plate assembly defines a generally U-shaped configuration and includes a pair of sub-plates with said pair of rollers supported on said pair of subplates and an actuator which is operable to move said subplates in a direction toward and away from one another.

4. A device as set forth in claim 3 wherein said floating plate assembly includes a guide rail spanning said subplates and a pair of guide rollers operatively engaging said guide rail to ensure rectilinear movement between said subplates as they are moved toward and away from one another.

5. A device as set forth in claim 4 wherein said assembly includes a fore and aft locating plate including an upstanding tab positioned between said pair of subplates and to serve to locate said subplates when they are disposed in their second position sufficiently close to one another to lift the vehicle and thereby position the vehicle in the fore and aft direction longitudinally relative to said assembly.

6. A device as set forth in claim 1 wherein said floating plate assembly includes a cam roller adapted to engage the side wall of the wheel and to equalize forces acting in a transverse direction relative to the wheel.

7. A device as set forth in claim 1 wherein said pair of rollers includes a drive roller and an idler roller, said drive roller being positively rotationally driven with respect to the wheel and said idler roller.

8. A device as set forth in claim 1 wherein said floating plate assembly is movably supported relative to the base on ball bearings.

9. A device as set forth in claim 1 wherein said floating plate assembly is movably supported relative to the base on a cushion of air.

10. A wheel alignment assembly for measuring predetermined alignment characteristics of a vehicle wheel having a tire mounted thereon, said assembly comprising:

a base on which a vehicle is supported during wheel alignment measuring operations;

a source of structured light for projecting a structured light pattern onto the tire or the vehicle;

a vehicle wheel support device, said device including a floating plate assembly movably supported relative to said base and including a pair of rollers wherein each of said rollers defines a longitudinal axis disposed in a fixed non-parallel orientation with respect to each other such that each of said longitudinal axes may be contained in any plane such that the plane of one said longitudinal axis is not parallel to the plane of the other said longitudinal axis, said floating plate assembly being movably positionable such that the vehicle wheel may be located between said pair of rollers and to isolate the vehicle wheel from the base so as to stabilize all forces acting thereon and wherein said pair of rollers rotate the wheel so that predetermined wheel alignment parameters may be measured.

11. A wheel alignment assembly as set forth in claim 10 wherein said rollers are movable in a direction toward and away from one another between a first position wherein said pair of rollers are spaced relative to one another so as to be disposed in non-contacting relation relative to the wheel and a second position wherein said rollers are positioned sufficiently close to one another to lift the vehicle wheel and isolate it from the base and stabilize all forces acting thereon.

12. A wheel alignment assembly as set forth in claim 11 wherein said floating plate assembly defines a generally U-shaped configuration and includes a pair of sub-plates with said pair of rollers supported on said pair of subplates and an actuator which is operable to move said subplates in a direction toward and away from one another.

13. A wheel alignment assembly as set forth in claim 12 wherein said floating plate assembly includes a guide rail spanning said subplates and a pair of guide rollers operatively engaging said guide rail to ensure rectilinear movement between said subplates as they are moved toward and away from one another.

14. A wheel alignment assembly as set forth in claim 13 wherein said assembly includes a fore and aft locating plate including an upstanding tab positioned between said pair of subplates and to serve to locate said subplates when they are disposed in their second position sufficiently close to one another to lift the vehicle and thereby position the vehicle in the fore and aft direction longitudinally relative to said assembly.

15. A wheel alignment assembly as set forth in claim 10 wherein said floating plate assembly includes a cam roller adapted to engage the side wall of the wheel and to equalize forces acting in a transverse direction relative to the wheel.

16. A wheel alignment assembly as set forth in claim 10 wherein said pair of rollers includes a drive roller and an idler roller, said drive roller being positively rotationally driven with respect to the wheel and said idler roller.

17. A wheel alignment assembly as set forth in claim 10 wherein said floating plate assembly is movably supported on bearings.

18. A wheel alignment assembly as set forth in claim 10 wherein said floating plate assembly is movably supported relative to the base on a cushion of air.

19. A wheel alignment assembly as set forth in claim 10 wherein said base includes a granite sub-base and a smooth sheet metal plate covering said sub-base on which said floating plate assembly is movably supported.

20. A wheel alignment assembly as set forth in claim 10 wherein said source of structured light includes a laser assembly associated with each wheel of the vehicle, each laser assembly movable fore and aft relative to the vehicle for accurately positioning said laser assemblies relative to successive vehicles measured on said wheel alignment assembly.

21. A wheel alignment assembly as set forth in claim 20 wherein said wheel alignment assembly includes a movable conveyor system for moving said laser assembly fore and aft relative to the vehicle and relative to said base.

22. A method of measuring alignment parameters of a vehicle wheel having a tire mounted thereon, said method comprising the steps of:

positioning a movable floating plate assembly having a pair of rollers wherein each of said rollers defines a longitudinal axis disposed in fixed, non-parallel orientation with respect to each other such that each of said longitudinal axes may be contained in any plane such that the plane of one said longitudinal axis is not parallel to the plane of the other said longitudinal axis and such that the wheel is located between the pair of rollers;

moving the pair of rollers in a direction toward one another such that the rollers engage and lift the wheel;

imparting rotational movement to the vehicle wheel; and sensing a rotational position of the wheel, calculating the alignment parameters of the wheel and comparing the alignment parameters so calculated with predetermined values for the alignment parameters.

23. A method as set forth in claim 22 further including the step of centering the wheel relative to the centerline of the vehicle prior to sensing the rotational position of the tire.

24. A method as set forth in claim 22 including the step of stabilizing the wheel on the rollers prior to sensing the rotational position of the tire.

25. A method as set forth in claim 24 including the step of centering the wheel relative to the centerline of the vehicle after the wheel has been stabilized and before sensing the rotational position of the tire.

26. A vehicle wheel support device for use in a wheel alignment assembly, said device comprising:

a floating plate assembly movably supported relative to a base upon which a vehicle is positioned;

said floating plate assembly including, a plurality of rollers, said plurality of rollers including a drive roller and a pair of idler rollers, said pair of idler rollers disposed in fixed, non-parallel orientation with respect to said drive roller, said floating plate being movably positionable such that a vehicle wheel may be located between said drive roller and said pair of idler rollers and to isolate the vehicle wheel from the base so as to stabilize all forces acting thereon and wherein said drive roller rotates the wheel so that predetermined wheel alignment parameters may be measured.

27. A device as set forth in claim 26 wherein said pair of idler rollers are disposed in fixed, non-parallel orientation with respect to one another.

28. A device as set forth in claim 27 wherein said pair of idler rollers are disposed in fixed, non-parallel orientation with respect to the base.

29. A wheel alignment assembly for measuring predetermined alignment characteristics of a vehicle wheel having a tire mounted thereon, said assembly comprising:

a base on which a vehicle is supported during wheel alignment measuring operations;

a source of structured light for projecting a structured light pattern onto the tire of the vehicle;

a vehicle wheel support device including a floating plate assembly movably supported relative to said base and including a plurality of rollers, said plurality of rollers including a drive roller and a pair of idler rollers, said pair of idler rollers disposed in a fixed non-parallel orientation with respect to said drive roller, said floating plate assembly being movably positionable such that the vehicle wheel may be located between said drive roller and said pair of idler rollers and to isolate the vehicle wheel from the base so as to stabilize all forces acting thereon and wherein said drive roller rotates the wheel so that predetermined wheel alignment parameters may be measured.

30. A wheel alignment assembly as set forth in claim 29 wherein said pair of idler rollers are disposed in fixed, non-parallel orientation with respect to one another.

31. A wheel alignment assembly as set forth in claim 30 wherein said pair of idler rollers are disposed in fixed, non-parallel orientation with respect to the base.

* * * * *